(12) United States Patent
Maeda

(10) Patent No.: US 10,726,651 B1
(45) Date of Patent: Jul. 28, 2020

(54) SYSTEM FOR ENABLING DOOR OF VEHICLE TO OPEN OR CLOSE UPON A VOCAL COMMAND

(71) Applicant: Philip Maeda, Torrance, CA (US)

(72) Inventor: Philip Maeda, Torrance, CA (US)

(73) Assignee: RYDEEN NORTH AMERICA, INC., Torrance, CA (US)

( * ) Notice: Subject to any disclaimer, the term of this patent is extended or adjusted under 35 U.S.C. 154(b) by 0 days.

(21) Appl. No.: 16/412,251

(22) Filed: May 14, 2019

(51) Int. Cl.
| G07C 9/00 | (2020.01) |
| G10L 15/22 | (2006.01) |
| E05F 15/60 | (2015.01) |
| E05F 15/73 | (2015.01) |

(52) U.S. Cl.
CPC .......... *G07C 9/00563* (2013.01); *E05F 15/60* (2015.01); *E05F 15/73* (2015.01); *G10L 15/22* (2013.01); *E05F 2015/763* (2015.01); *G10L 2015/223* (2013.01)

(58) Field of Classification Search
None
See application file for complete search history.

(56) References Cited

U.S. PATENT DOCUMENTS

| 4,856,072 A | * | 8/1989 | Schneider | ........... B60R 16/0373 |
| | | | | 381/86 |
| 5,245,694 A | * | 9/1993 | Zwern | ................. B60R 16/0373 |
| | | | | 704/200 |
| 10,151,136 B2 | | 12/2018 | Myers et al. | |
| 2019/0355349 A1 | * | 11/2019 | Chen | ....................... G10L 17/22 |

* cited by examiner

*Primary Examiner* — Carlos Garcia

(74) *Attorney, Agent, or Firm* — Irving Keschner

(57) ABSTRACT

A device that either opens or closes the rear door of a vehicle depending upon the specific vocal commands of a user.

6 Claims, 4 Drawing Sheets

SYSTEM FOR ENABLING DOOR OF VEHICLE TO OPEN OR CLOSE UPON A VOCAL COMMAND

BACKGROUND OF THE INVENTION

1. Field of the Invention

The present invention provides a system which enables a person to open or close a door of a vehicle upon a vocal command.

2. Description of the Prior Art

U.S. Pat. No. 10,151,136 to Myers et al discloses a system for opening an access point, such as a vehicle truck door, upon receiving a wireless signal from a remote controller carried by a user. The trunk door can also be opened by a receiving audio data indicating the user is approaching the vehicle. Devices such as the one disclosed in the 136 patent typically use remote controls or a manual switch to open a vehicle truck door which are inefficient such as when a driver approaches the vehicle having his/her hands full. The '136 patent fails to disclose ways to prevent the vocal command from persons, other than the vehicle user, from opening the vehicle door. In addition, the patent fails to disclose how a vocal command can close the opened vehicle door.

What is desired is to provide a vehicle door opening/closing system which overcomes the disadvantages of prior systems that use vocal commands to open or close a vehicle door.

SUMMARY OF THE INVENTION

The present invention provides a system for opening/closing a door of a vehicle using voice recognition techniques instead of remote controls or manual switches. A voice recognition system is coupled to the conventional vehicle mechanical system that is used to open and close a vehicle door, typically rear door. The voice recognition system is programmed to recognize specific code words uttered by the vehicle operator, a first code word opening the vehicle door, a second code word closing the door. Specifically a microcontroller based components which is attached to a vehicle door, initially samples the voice frequency pattern of a number of individuals and then develops an average frequency pattern from the sample. Specific vocal commands within said frequency range are developed which, when uttered by a user, opens or closes a vehicle door. The microcontroller generates signals corresponding to said vocal commands which in turn, trigger signals which are coupled to the mechanical control system of the vehicle door which normally operates to open or close the vehicle door.

The system of the present invention provides a simple efficient and secure technical for opening or closing a vehicle door.

DESCRIPTION OF THE DRAWINGS

For a better understanding of the present invention as well as other objects and further features thereof, reference is made to the following description which is to be read in conjunction with the accompanying drawing therein.

DESCRIPTION OF THE INVENTION

Figure 1:
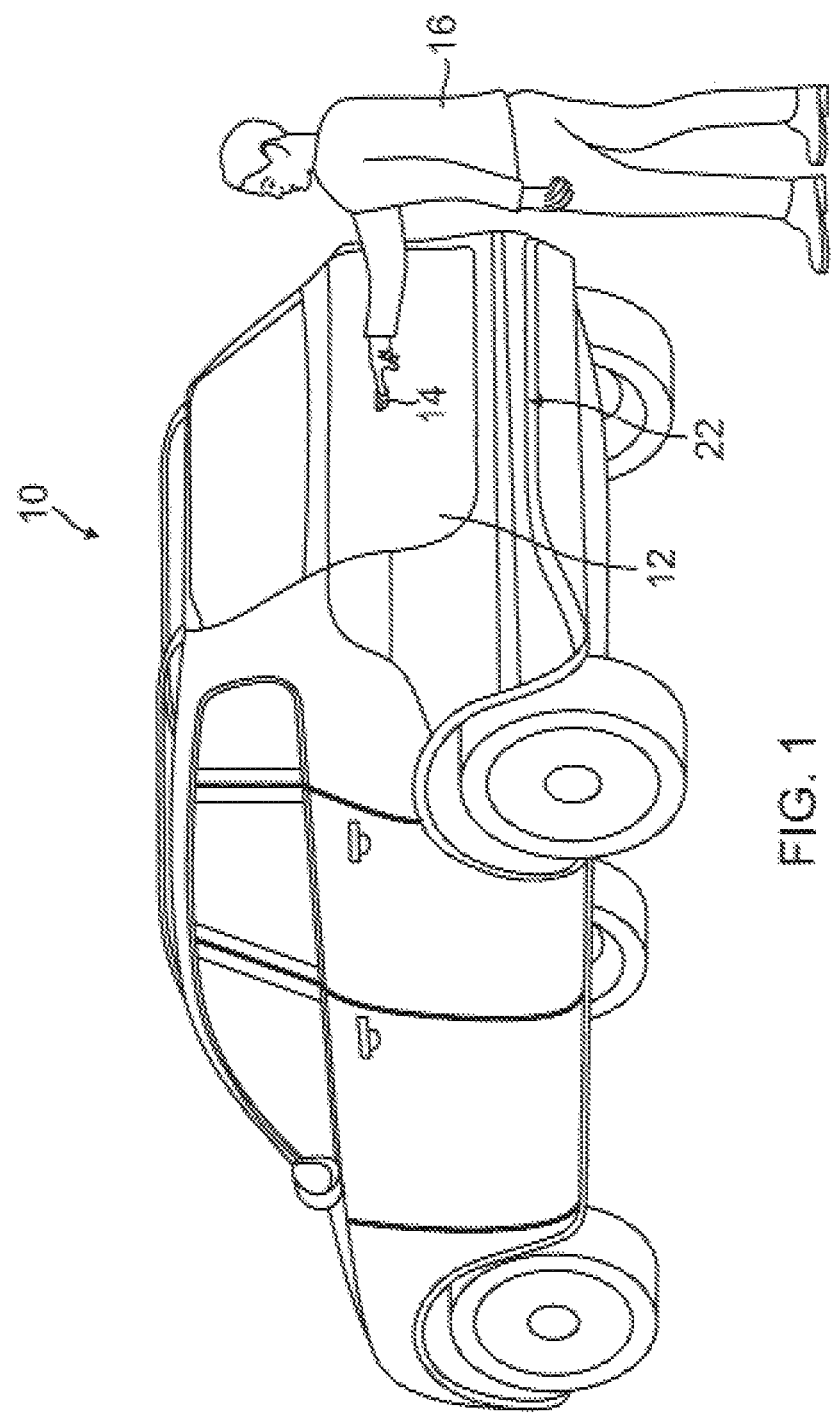
FIG. 1 is a view of a conventional vehicle, such as a SUV, having a rear door shown in the closed position.
Figure 2:
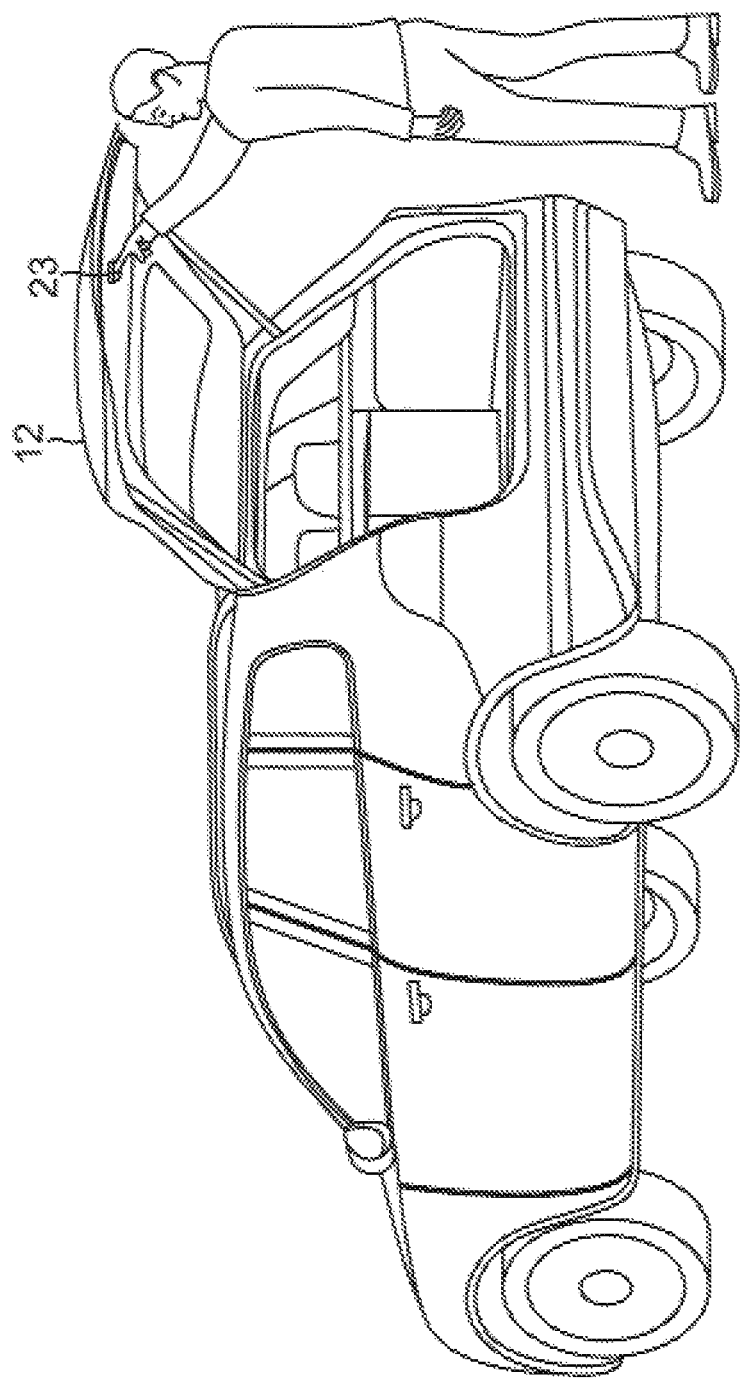
FIG. 2 is a view of the vehicle shown in the FIG. 1 with the rear door opened.
Figure 3:
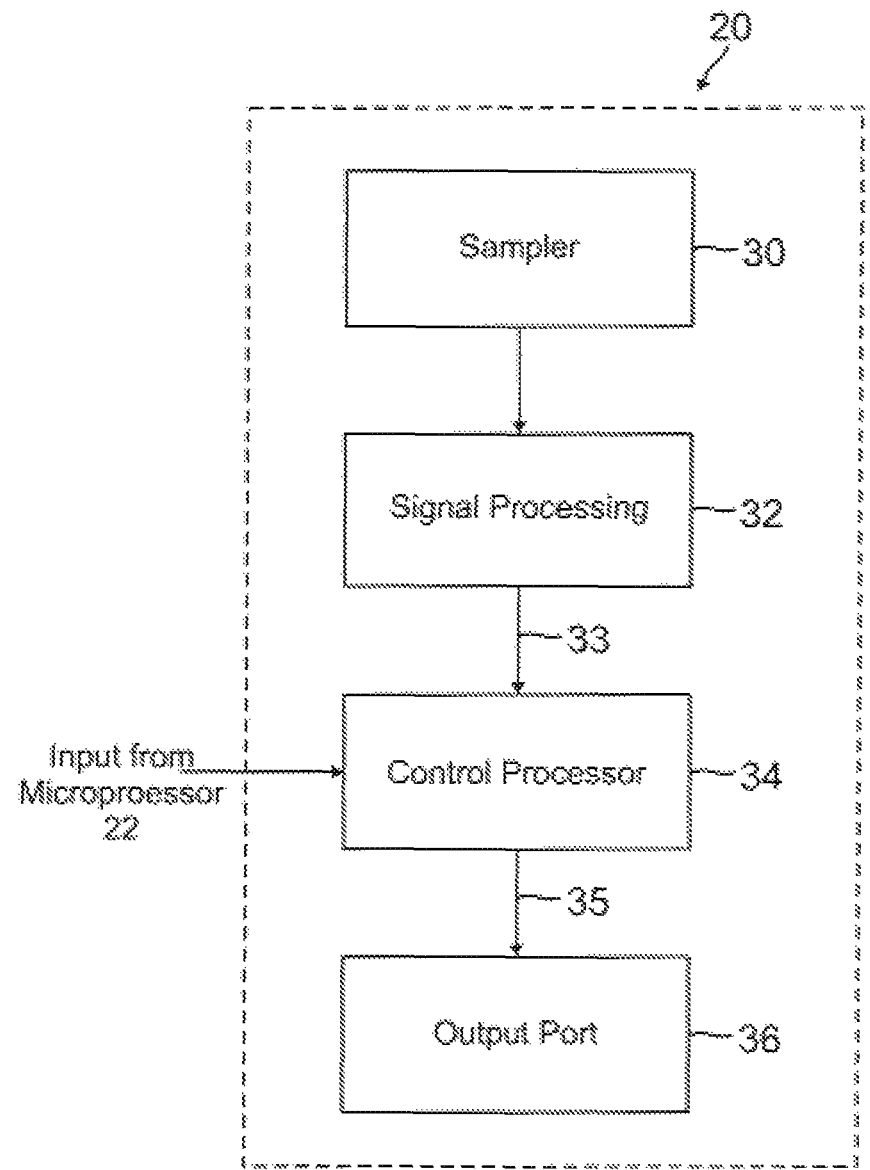
FIG. 3 is a simplified block diagram illustrating the general processing of a voice command.

Referring to FIG. 1, a vehicle 10, such as a SUV, is shown with its rear, or backdoor 12, in its closed position. For most conventional vehicles, rear door 12 can be opened by manually engaging a switch 14 accessible to a user 16, (presumably an occupant of vehicle 10). FIG. 2 shows door 12 in the open position. In accordance, with the teachings of the present invention, manual switch 14 is replaced with a microcontroller based ("MCU") device 20, a simplified flowchart for MCU 20 being shown in FIG. 3, the flowchart including sampler 30, signal processing device 32, control processor 34 and output port 36.

Samples 30 samples the audio output from a number of human speakers and provides electrical signals on lead 31 which is coupled to signal processing unit 32. Unit 32 generates an average vocal frequency that is selected to be the voice frequency that the system will respond to when a speaker utters a specific code word. Control processor 34 receives the input from microphone 22 and then determines if the electrical signal from microphone 22 is the preselected code word by comparing it to the output generated on lead 33 from device 32 (note that the voice command is programmable such that any command i.e. "I want ice cream" can open the vehicle door and a different voice command such as "close it up" will close the vehicle door).

Figure 4:
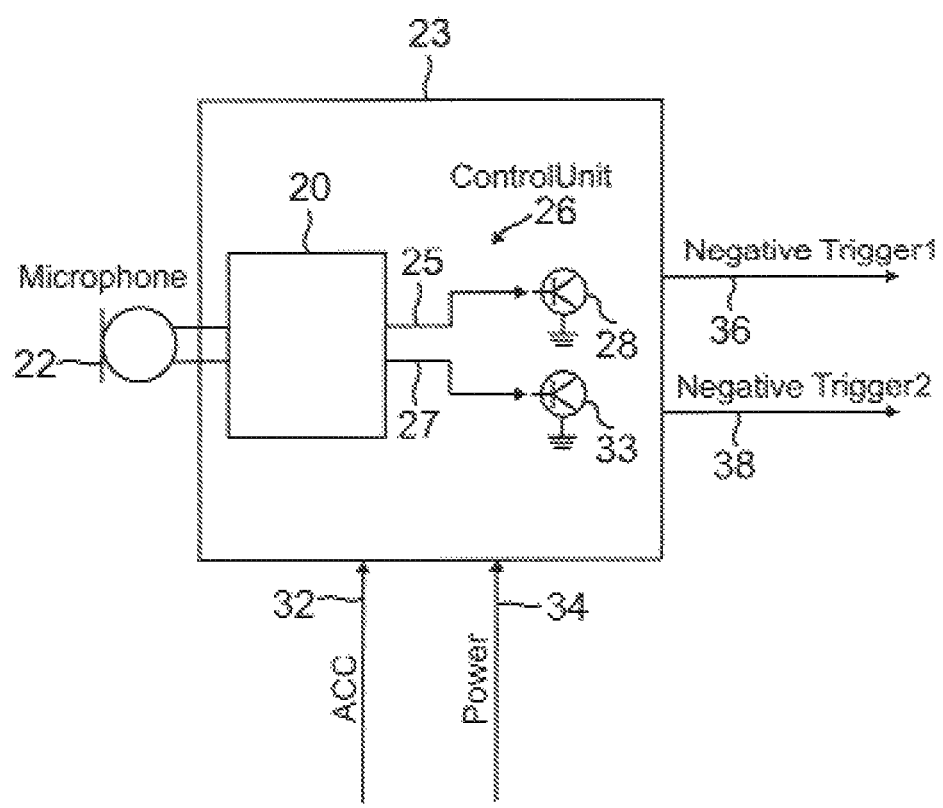
FIG. 4 is a simplified schematic of the component layout and input/output functions.

Referring now to FIG. 4, microphone 22 responds to a vocal command from user 16, the output from microphone 22 being coupled to microcontroller unit 20. Unit 20 processes the audio output as described with reference to FIG. 3 and provides appropriate signals on leads 25 and 27, the output signal therefore being coupled to control units 28 and 33. Microcontroller 20 determines (via a voice algorithm, not shown) whether the user has vocalized an open or close door predetermined word command and, in response thereto, provides an output on either lead 25 or 27. An ACC signal is furnished to unit 23 via lead 32 and power is furnished to unit 23 via lead 34. The output from trigger unit 28 is provided on lead 36 and the output from trigger unit 30 is provided on lead 38. The output signal on lead 36 operates to open the vehicle door and the signal on lead 38 operates to close the vehicle door.

The present invention can be used with any vehicle having doors with a motorized mechanism for automatically opening or closing the door. The key words necessary to open or close vehicle door 12, stored in, control processor 34 would be provided to user 16. Thus, when the predesignated code word is uttered, door 12 opens or closes.

A voice controlled trunk access kit (not shown) includes unit 23 and a wire harness and is designed for use with a vehicle equipped with a power hack door/trunk and vehicles with a passive keyless entry (PKE). Unit 23 incorporates microcontroller 20 and control units 28 and 30.

The kit includes a wire harness connected to unit 23, the output wires from the harness being coupled, in sequence, to the back door opener trigger (negative), to back door close trigger (negative), ground, vehicle battery (+12V) and ACC (a connection to ground not being shown).

Microphone 22 is installed preferably to the vehicle outside power back door as shown in FIG. 1 whereas unit 23 is attached inside the vehicle back door as shown in FIG. 2.

In operation, while the operator carrying a smart key approaches the vehicle (back) door and vocalizes the predetermined OPEN COMMAND, the system responds and opens the door. The CLOSE COMMAND activates the door closing mechanism. With a vehicle having a power back door feature only, it is necessary that the vehicle is unlocked prior to initiating the system. In this case, the operator moves close to the back door and uses the OPEN COMMAND to activate the power door opener and the CLOSE COMMAND is subsequently used to trigger the back door closer.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A voice activated device for opening and closing a door of a vehicle upon the vocal command of a user comprising:

a microphone positioned on said vehicle and responsive to a vocal command from a user and generating a first signal in response thereto;

a voice recognition device responsive to said first signal and generating either a second or a third signal dependent upon said vocal command;

a first control circuit for generating a fourth or fifth signal on a first or second output lead dependent upon whether said second or third signal has been generated; and a second control circuit responsive to said fourth or fifth signals for generating a sixth signal which activates a mechanism that operates to open or close said door.

2. The system of claim 1 wherein a voice sample of a number of persons is used to generate an average voice pattern which is utilized to respond to specific vocal commands of the user.

3. The system of claim 2 wherein a first vocal command causes said vehicle door to open.

4. The system of claim 3 wherein a second vocal command causes said vehicle door to close.

5. The system of claim 2 wherein said microphone generated signal is coupled to a microcontroller.

6. The system of claim 5 wherein said microcontroller determines whether signal generated by said microphone is within a predetermined vocal pattern frequency range.

\* \* \* \* \*